(12) United States Patent
D'Aluisio

(10) Patent No.: US 10,689,048 B2
(45) Date of Patent: Jun. 23, 2020

(54) BICYCLE WITH SUSPENDED CRANK AND SADDLE

(71) Applicant: Specialized Bicycle Components, Inc., Morgan Hill, CA (US)

(72) Inventor: Christopher P. D'Aluisio, Corralitos, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 147 days.

(21) Appl. No.: 15/876,964

(22) Filed: Jan. 22, 2018

(65) Prior Publication Data

US 2019/0225291 A1 Jul. 25, 2019

(51) Int. Cl.
*B62J 1/06* (2006.01)
*B62K 25/00* (2006.01)
*B62K 3/02* (2006.01)
*B62K 19/34* (2006.01)
*B62K 19/36* (2006.01)

(52) U.S. Cl.
CPC .................. *B62J 1/06* (2013.01); *B62K 3/02* (2013.01); *B62K 19/34* (2013.01); *B62K 19/36* (2013.01); *B62K 25/00* (2013.01)

(58) Field of Classification Search
CPC ............... B62J 1/06; B62K 3/02; B62K 25/00
USPC ....................................................... 280/283
See application file for complete search history.

(56) References Cited

U.S. PATENT DOCUMENTS

| 4,679,811 | A | | 7/1987 | Shuler | |
|---|---|---|---|---|---|
| 5,435,584 | A | | 7/1995 | Buell | |
| 5,452,910 | A | * | 9/1995 | Harris | B62K 25/26 280/283 |
| 5,628,524 | A | | 5/1997 | Klassen et al. | |
| 5,772,228 | A | | 6/1998 | Owyang | |
| 6,036,213 | A | | 3/2000 | Busby | |
| 6,073,950 | A | | 6/2000 | Busby | |
| 6,099,010 | A | | 8/2000 | Busby | |
| 6,349,957 | B2 | | 2/2002 | Smith | |
| 7,815,207 | B2 | * | 10/2010 | Currie | B62K 25/286 280/284 |

(Continued)

*Primary Examiner* — Jacob D Knutson
*Assistant Examiner* — Felicia L. Brittman
(74) *Attorney, Agent, or Firm* — Michael Best & Friedrich LLP

(57) ABSTRACT

A bicycle comprises a main frame and a suspension assembly coupled to the main frame. The suspension assembly includes a dynamic crank support and a spring mechanism. The dynamic crank support is movable from an uncompressed position to a compressed position. The spring mechanism biases the dynamic crank support toward the uncompressed position. The suspension assembly further comprises a dynamic seat support coupled for movement with the dynamic crank support. For example, the dynamic seat support and the dynamic crank support can be rigidly coupled to each other and cooperatively form one bar of a four-bar linkage. An eccentric assembly is supported by the main frame and rotates about a first axis. The eccentric assembly pivotally supports the dynamic crank support for rotation about a second axis offset from the first axis. The spring mechanism preferably comprises a spring secured between the main frame and the eccentric assembly to rotationally bias the eccentric assembly.

20 Claims, 8 Drawing Sheets

(56) References Cited

U.S. PATENT DOCUMENTS

| | | | |
|---|---|---|---|
| 7,891,688 B2 * | 2/2011 | Chamberlain | B62K 25/30 280/281.1 |
| 2016/0257371 A1 | 9/2016 | Droux | |
| 2016/0368559 A1 | 12/2016 | Voss | |

* cited by examiner

BICYCLE WITH SUSPENDED CRANK AND SADDLE

BACKGROUND

The present invention relates generally to the field of bicycles and specifically to suspension systems for smoothing the transmission of road shock to the rider of a bicycle.

Some bicycles have suspension systems for damping the transmission of road-induced shock and vibration to the rider. For example, it is known to provide suspension systems in a front fork to dampen road shock inputted to the front wheel, and in a rear portion of the frame to dampen road shock inputted to the rear wheel. It is also known to provide suspension systems between the saddle and frame and between the handlebars and frame, to reduce transmission of road shock to the rider.

SUMMARY

The present invention provides a bicycle comprising front and rear wheels, a main frame supported in the front and rear wheels, and a suspension assembly coupled to the main frame. The suspension assembly includes a dynamic crank support and a spring mechanism. The dynamic crank support is coupled to the main frame and movable from an uncompressed position to a compressed position relative to the main frame. The spring mechanism biases the dynamic crank support toward the uncompressed position. The bicycle further comprises a crank assembly including a crank arm rotationally coupled to the dynamic crank support.

In one embodiment, the suspension assembly further comprises a dynamic seat support coupled for movement with the dynamic crank support relative to the main frame between the uncompressed and compressed positions. An upper portion of the dynamic seat support supports a bicycle seat. For example, the dynamic seat support and the dynamic crank support can be rigidly coupled to each other and cooperatively form one bar of a four-bar linkage. Movement from the uncompressed position to the compressed position results in the dynamic crank support moving a first horizontal displacement and results in the upper portion of the dynamic seat support moving a second horizontal displacement that is preferably greater than the first horizontal displacement. The upper portion of the dynamic seat support can be pivotally coupled to the main frame by an upper link In order to guide movement of the dynamic crank support, the suspension assembly can further include an eccentric assembly supported by the main frame for rotation about a first axis. The eccentric assembly pivotally supports the dynamic crank support for rotation about a second axis offset from the first axis. For example, the second axis can orbit about the first axis when the dynamic crank support moves from the uncompressed position to the compressed position. In this embodiment of the invention, the spring mechanism preferably comprises a spring secured between the main frame and the eccentric assembly to rotationally bias the eccentric assembly. Alternatively, the eccentric assembly can be replaced by a lower link Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
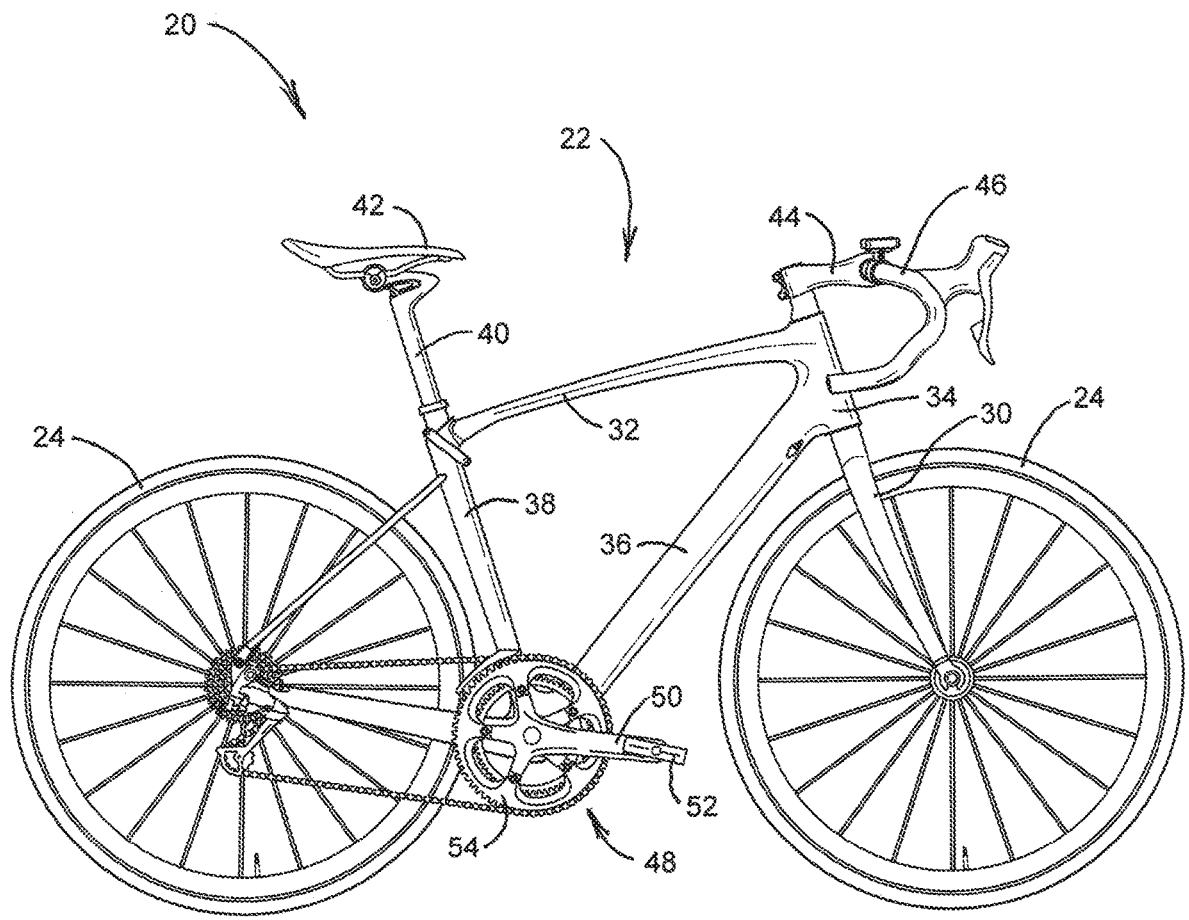
FIG. 1 is a side view of a bicycle including a frame assembly with a suspension system embodying the present invention.
Figure 2:
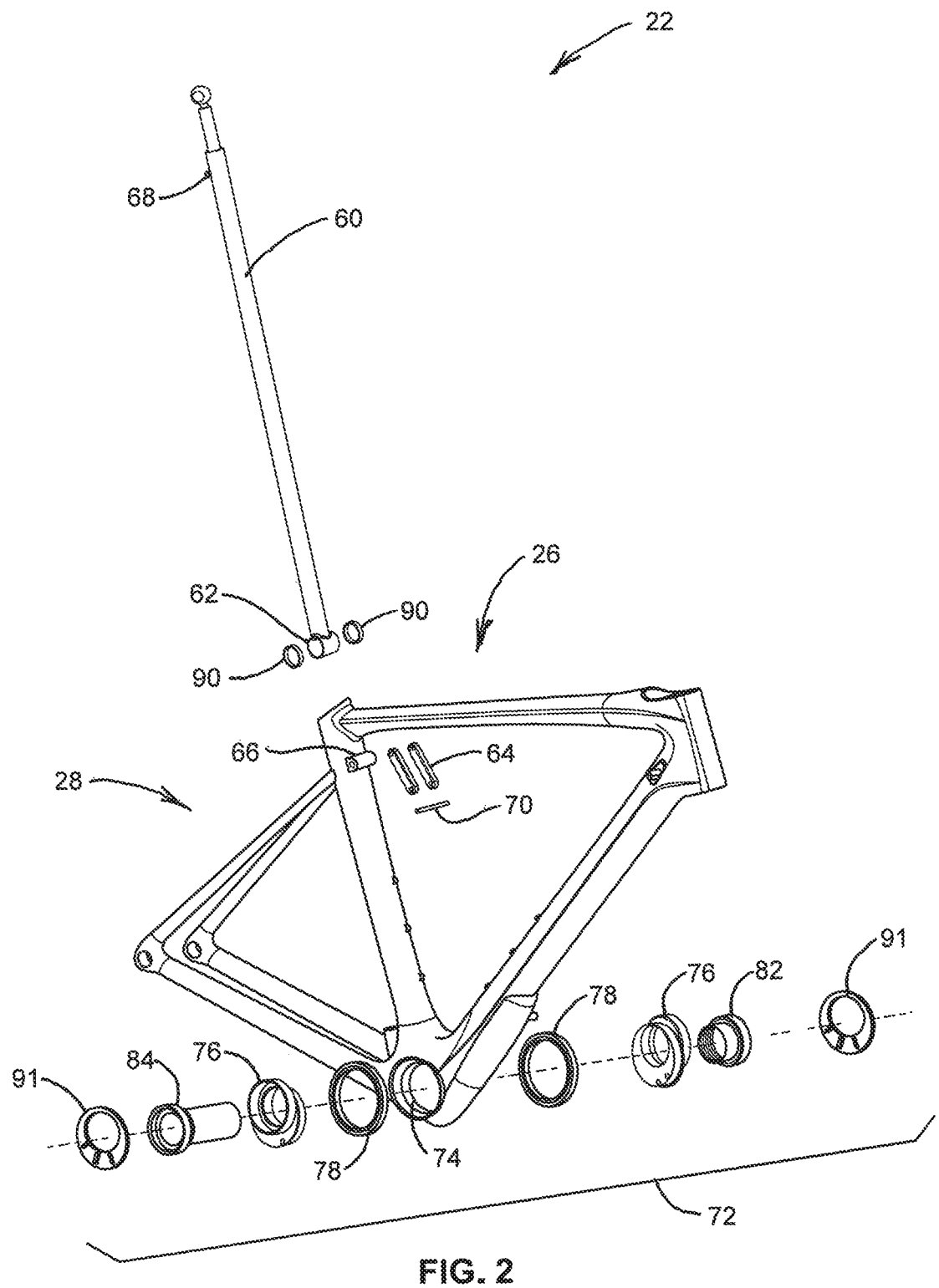
FIG. 2 is an exploded view of the frame assembly of the bicycle in FIG. 1.

FIGS. 1 and 2 show a bicycle 20 having a frame assembly 22 supported on two wheels 24. The frame assembly 22 includes a main frame 26, a rear triangle 28, and a front fork 30 to facilitate steering the bicycle 20. The main frame 26 includes a top tube 32, a head tube 34, a down tube 36, and a static seat tube 38. A seat post 40 is provided to support a saddle 42, and a stem 44 is provided for securing handlebars 46 to the front fork 30. A crank assembly 48 having crank arms 50, pedals 52, a spindle (not shown), a chainring 54, and crank bearings (not shown) facilitate pedaling of the bicycle 20, as is known in the art.

Referring to FIG. 2, the bicycle 20 further includes a suspension assembly that resiliently supports the saddle 42 and the crank assembly 48 relative to the main frame 26. Specifically, the suspension assembly includes a dynamic seat support in the form of a moving seat tube 60 and a dynamic crank support in the form of a moving bottom bracket 62. The illustrated moving seat tube 60 and moving bottom bracket 62 are secured together such that they move with each other relative to the main frame between a raised, uncompressed position and a lowered, compressed position, as described below in more detail.

Figure 3:
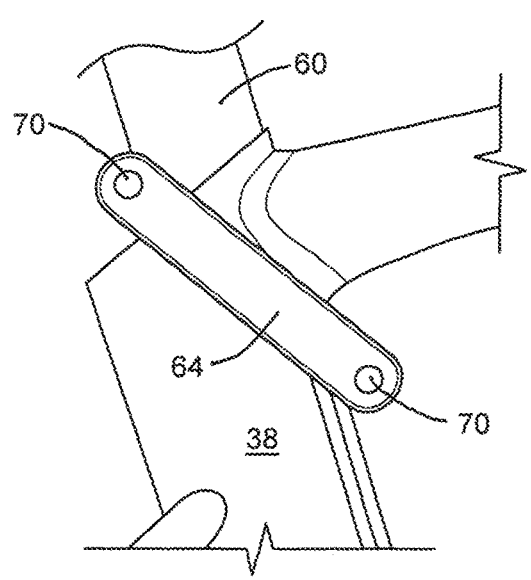
FIG. 3 is an enlarged side view of an upper portion of the suspension system in an uncompressed position.
Figure 4:
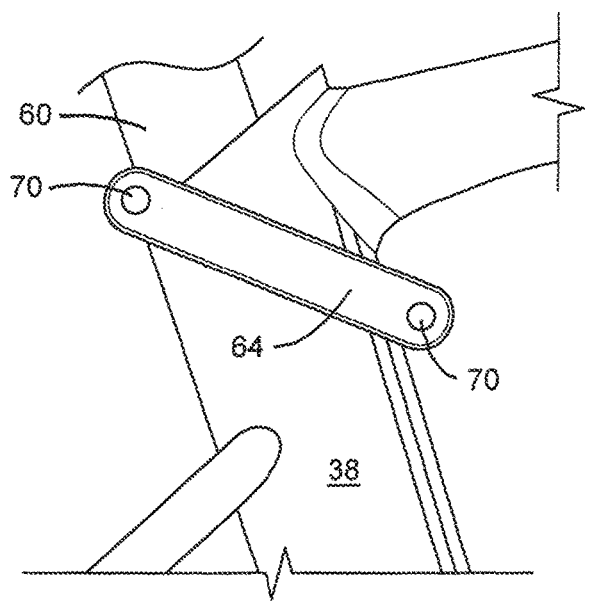
FIG. 4 is the side view of FIG. 3 with the suspension system in a compressed position.

As shown in FIGS. 2-4, movement of the upper end of the moving seat tube 60 is controlled by upper links 64 that pivotally connect an upper static boss 66 on the main frame 26 to an upper dynamic boss 68 on the upper end of the moving seat tube 60. Upper pivot pins 70 are used to make the connections. The upper links 64 control movement of the upper end of the moving seat tube 60 between the uncompressed position (FIG. 3) and compressed position (FIG. 4).

Figure 5:
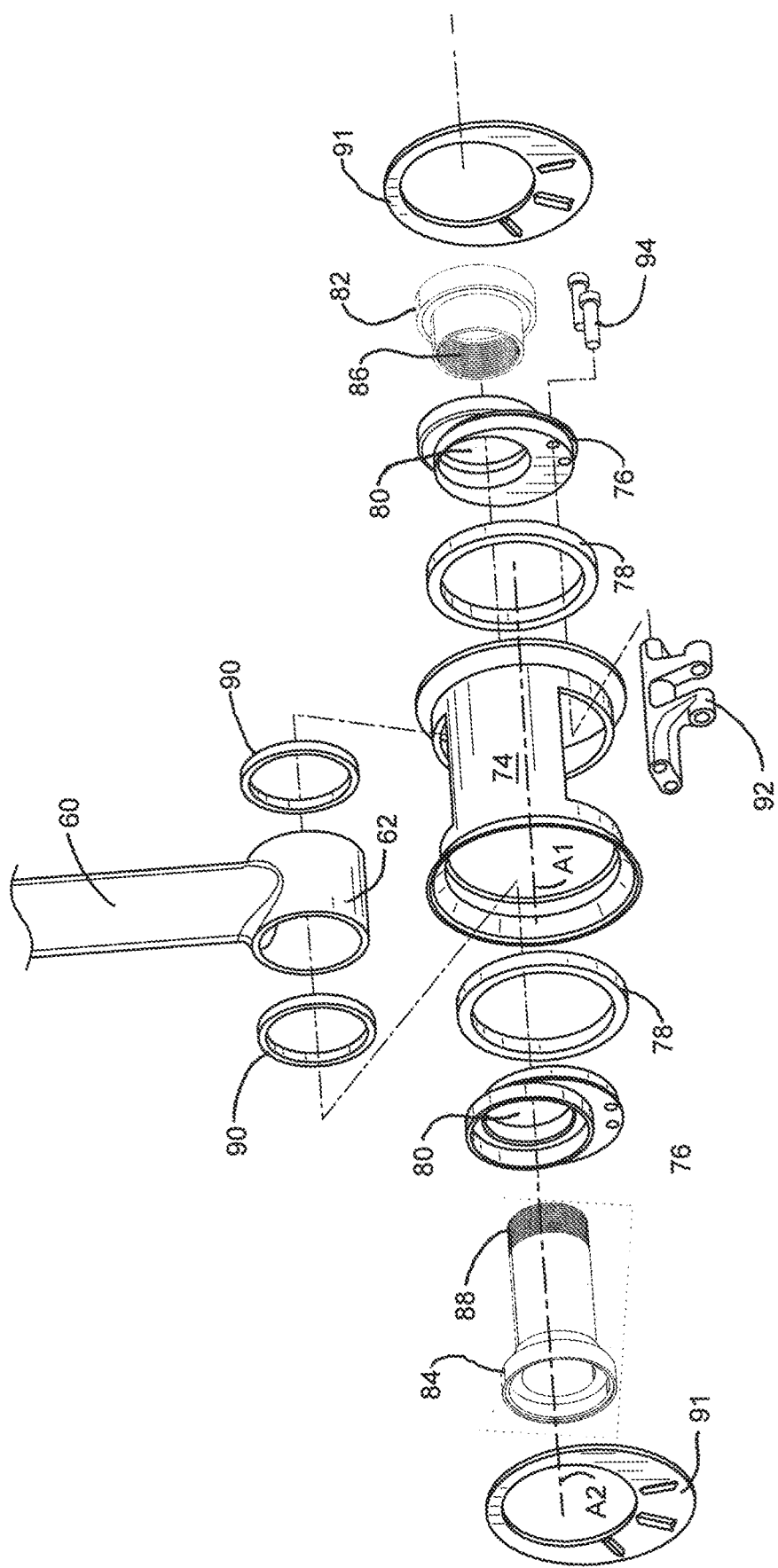
FIG. 5 is an exploded perspective view of an eccentric assembly of the bicycle in FIG. 2.

Movement of the moving bottom bracket 62 is controlled by an eccentric assembly 72 that guides movement of the moving bottom bracket 62 along an arcuate path. Specifically referring to FIGS. 2 and 5, the eccentric assembly 72 includes a lower shell 74 that is secured to the main frame 26. Eccentric plates 76 are rotationally supported in the lower shell 74 by eccentric bearings 78 for rotation about a first axis A1. Each eccentric plate 76 includes an eccentric opening 80 defining a second axis A2 and that is adapted to receive a left bearing support 82 and a right bearing support 84, respectively. As shown in FIG. 5, the left bearing support 82 includes an internal thread 86, and the right bearing support 84 includes a threaded support tube 88 that mates with the internal thread 86. When assembled, the left and right bearing supports 82, 84 are adapted to rotationally support the crank assembly 48.

Prior to threading the support tube 88 into the left bearing support 82, the support tube 88 passes through pivot bearings 90 and through the moving bottom bracket 62 such that the moving bottom bracket 62 is rotationally coupled to the support tube 88. In this regard, it can be seen that rotational movement of the eccentric plates 76 results in orbiting movement of the moving bottom bracket 62 around the first axis A1. Combined with the upper links 64, the illustrated arrangement is a four-bar linkage with the moving seat tube 60 and moving bottom bracket 62 cooperatively forming one of the bars of the four-bar linkage.

The eccentric plates 76 are secured to each other by a clevis member 92 and fasteners 94 (only two of four fasteners are shown in FIG. 5) such that the eccentric plates 76 will rotate in unison relative to the lower shell 74. Rotation of the eccentric plates 76 results in orbital movement of the moving bottom bracket 62 and clevis member 92 about the first axis A1.

Figure 6:
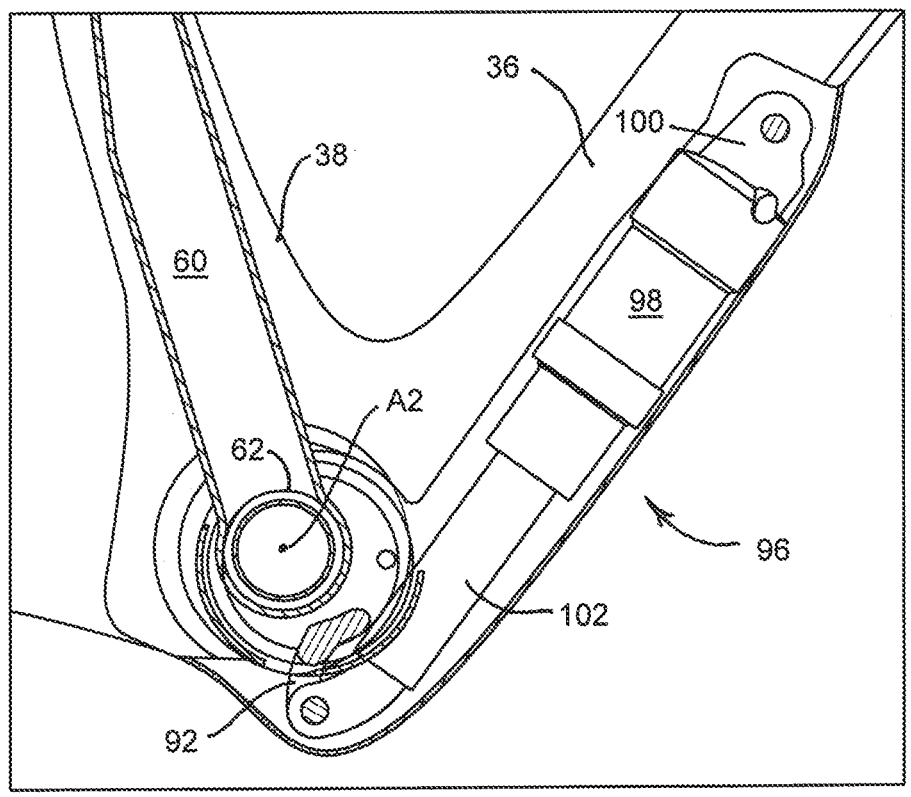
FIG. 6 is an enlarged side section view of a lower portion of the suspension system in an uncompressed position.
Figure 7:
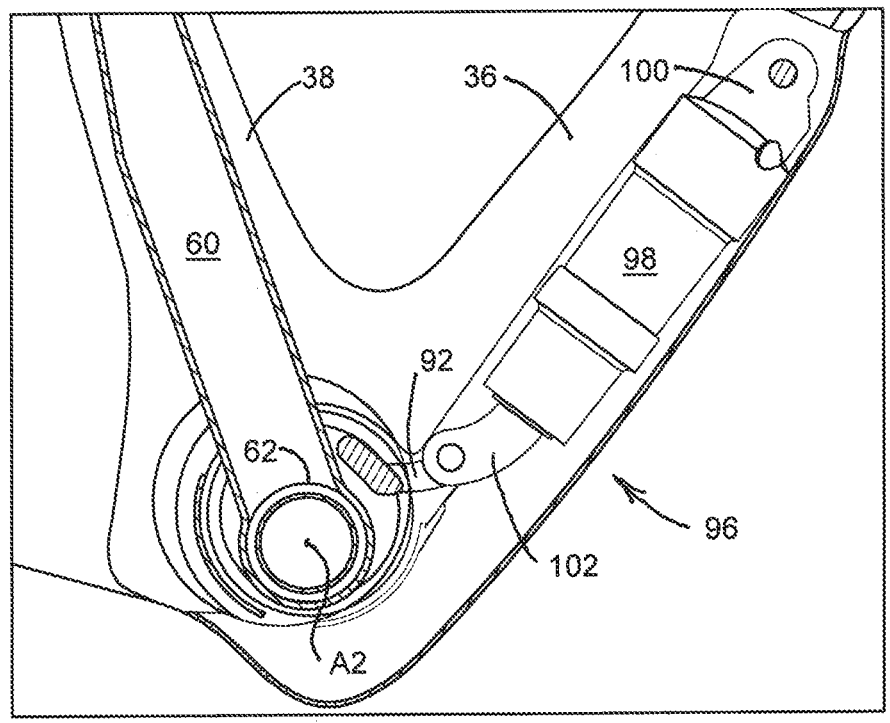
FIG. 7 is the side section view of FIG. 6 with the suspension system in a compressed position.

Referring to FIGS. 5-7, the clevis member 92 provides a connection point between the eccentric assembly 72 and a spring assembly 96 that provides a biasing force on the eccentric assembly 72 in a clockwise direction as view in FIGS. 6 and 7. This clockwise bias to the eccentric assembly results in an upward bias on the moving bottom bracket 62 and moving seat tube 60.

The spring assembly 96 comprises a spring housing 98 having a mounting boss 100 that is pivotally attached to the main frame 26 by, for example, a heim joint (not shown). The spring assembly 98 further includes a spring rod 102 that is slidable into and out of the spring housing 98 between an extended position (FIG. 6) and a retracted position (FIG. 7). An internal spring (not shown) biases the spring rod 102 toward the extended position relative to the spring housing 98. The end of the spring rod 102 is pivotally attached to the clevis member 92 by, for example, a heim joint (not shown). By virtue of this arrangement, it can be seen that the spring assembly 96 biases the eccentric assembly 72 in the clockwise direction (as shown in FIGS. 6 and 7), which results in the moving bottom bracket 62 and moving seat tube 60 being biased generally upward relative to the main frame 26.

Figure 8:
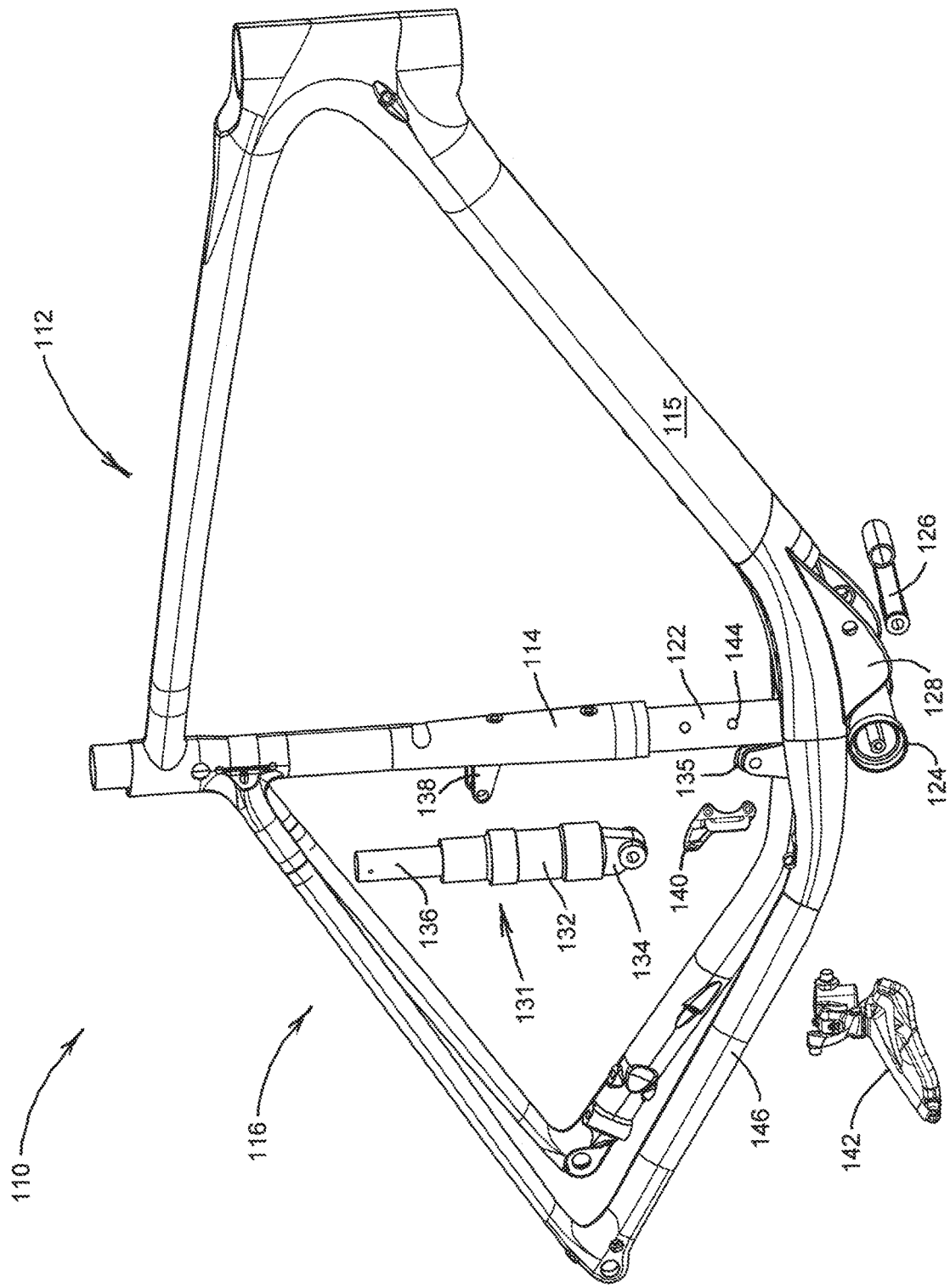
FIG. 8 is a perspective view of a frame assembly with a suspension system that represents a second embodiment of the present invention.
Figure 9:
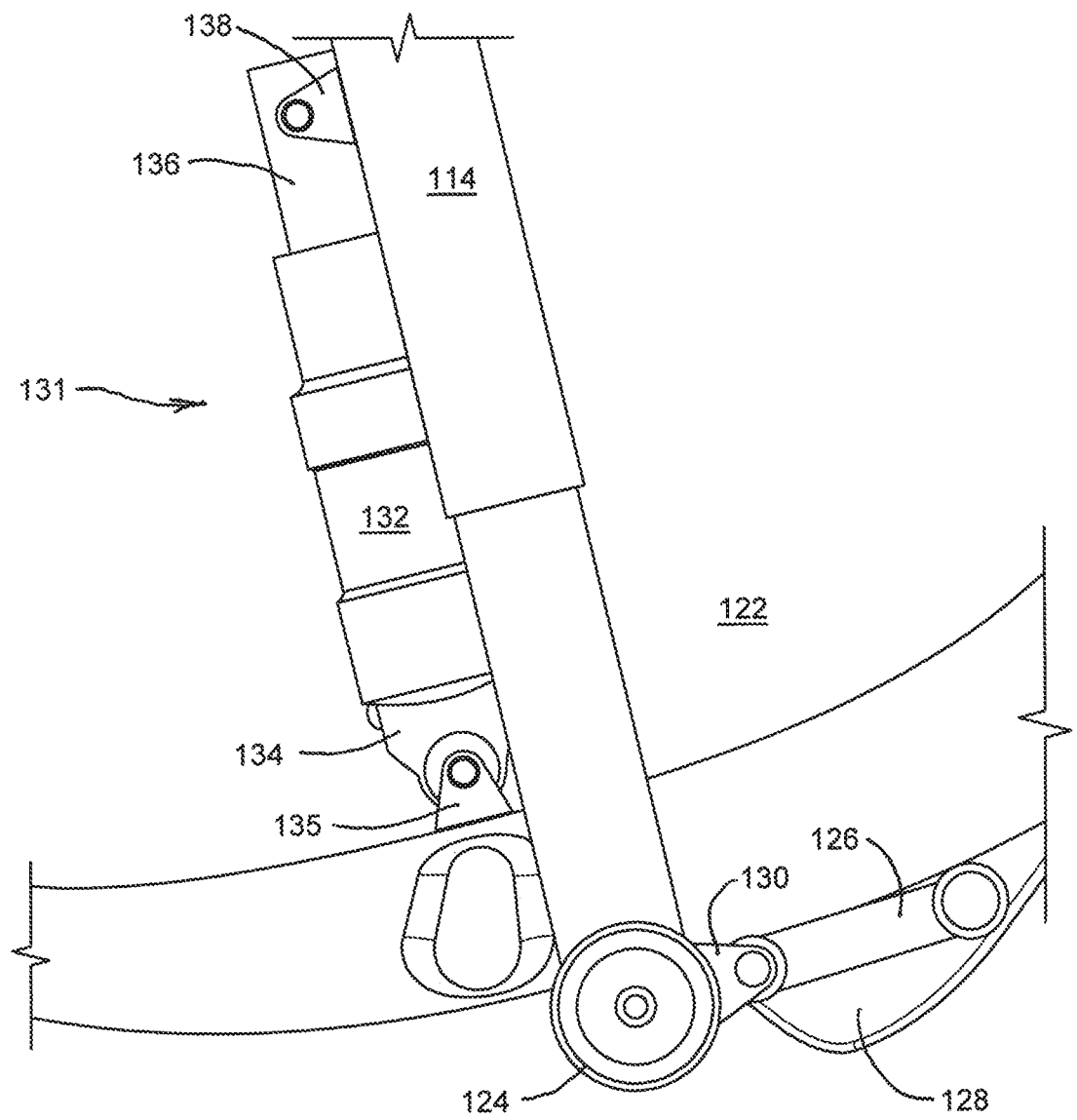
FIG. 9 is an enlarged side section view of a lower portion of the suspension system in FIG. 8 in an uncompressed position.
Figure 10:
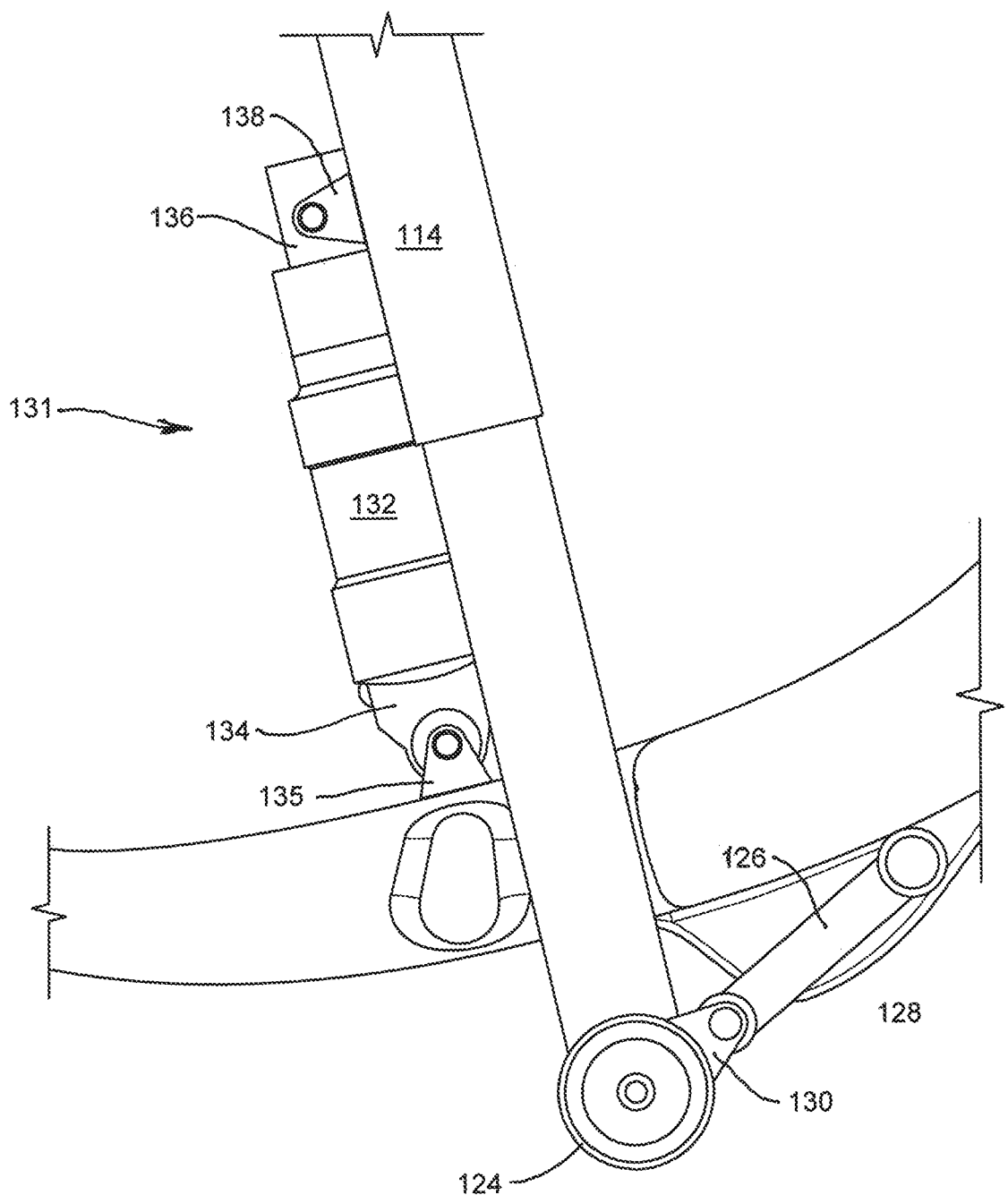
FIG. 10 is the side section view of FIG. 9 with the suspension system in a compressed position.

A second embodiment of the invention is illustrated in FIGS. 8-10. In this embodiment, the frame assembly 110 includes a main frame 112 with a static seat tube 114, a down tube 115, and a rear triangle 116. The frame assembly 110 further includes a suspension assembly having a dynamic seat support in the form of a moving seat tube 122 and a dynamic crank support in the form of a moving bottom bracket 124. Like the first embodiment, the illustrated moving seat tube 122 and moving bottom bracket 124 are secured together such that they move with each other relative to the main frame 112 between a raised, uncompressed position and a lowered compressed position.

Referring to FIGS. 8-10, movement of the upper end of the moving seat tube 122 is controlled by upper links (not shown in FIGS. 8-10) in the same manner as described above in connection with the first embodiment. However, movement of the moving bottom bracket 124 is not controlled by an eccentric assembly, but rather by a lower link 126 that pivotally connects a frame clevis 128 on the main frame 112 to a crank clevis 130 on the moving bottom bracket 124. Coupling of the lower link 126 to the frame clevis 128 and crank clevis 130 is accomplished using appropriate fasteners (not shown), such as pins, bolts, or the like. Combined with the upper links, the illustrated arrangement is a four-bar linkage with the moving seat tube 122 and moving bottom bracket 124 cooperatively forming one bar of the four-bar linkage.

The suspension system 120 further includes a spring assembly 131 coupled between the main frame 112 and the unified moving bottom bracket 124 and moving seat tube 122. In the illustrated embodiment, the spring assembly 131 includes a spring housing 132 having a mounting boss 134 that is pivotally attached to a static bracket 135 by, for example, a heim joint (not shown). The spring assembly 131 further includes a spring rod 136 that is slidable into and out of the spring housing 132 between an extended position (FIG. 9) and a retracted position (FIG. 10). An internal spring (not shown) biases the spring rod 136 toward the extended position relative. The end of the spring rod 136 is pivotally attached to a moving boss 138 by, for example, a heim joint (not shown). The moving boss 138 is secured to and moves with the moving seat tube 122. The moving boss 138 extends from the moving seat tube 122 through a slot (not shown) in the static seat tube 114 to provide physical access by the spring assembly 131. By virtue of this arrangement, it can be seen that the spring assembly 130 biases the moving bottom bracket 124 and moving seat tube 122 upward (as shown in FIGS. 9 and 10) relative to the main frame 112.

Referring back to FIG. 8, it can be seen that the frame assembly includes a front derailleur mount 140 that is designed to accommodate a front derailleur 142. Because it is preferred to have the front derailleur 142 stay in position relative to the crank assembly, the front derailleur mount 140 is secured to the moving seat tube 122 using threaded fasteners (not shown) threaded into threaded holes 144 in the moving seat tube 122. In the illustrated embodiment, the static seat tube 114 is cut off and does not extend all the way to the down tube 115 or chain stays 146, thus providing access to the threaded holes 144 and front derailleur mount 140. However, it can be appreciated that the static seat tube 114 could extend all the way down to the down tube 115 and chainstays 146, and the front derailleur mount 140 could extend through a slotted opening in the static seat tube 114.

Various features of the invention are set forth in the following claims.

The invention claimed is:

1. A bicycle comprising:
   a front wheel and a rear wheel;
   a main frame supported on the front wheel and the rear wheel;
   a suspension assembly coupled to the main frame; the suspension assembly including:
      a dynamic crank support coupled to the main frame and movable along an arcuate path from an uncompressed position to a compressed position relative to the main frame; and
      a spring mechanism biasing the dynamic crank support toward the uncompressed position; and
   a crank assembly including a crank arm rotationally coupled to the dynamic crank support, wherein the crank assembly is movable with the dynamic crank support relative to the main frame between the uncompressed position and the compressed position.

2. A bicycle as claimed in claim 1, wherein the suspension assembly further comprises a dynamic seat support coupled for movement with the dynamic crank support relative to the main frame between the uncompressed position and the compressed position, wherein an upper portion of the dynamic seat support supports a bicycle seat.

3. A bicycle as claimed in claim 2, wherein the dynamic seat support and the dynamic crank support are rigidly coupled to each other and cooperatively form one bar of a four-bar linkage.

4. A bicycle as claimed in claim 2, wherein the suspension assembly further comprises an upper link for pivotally linking the upper portion of the dynamic seat support to the main frame.

5. A bicycle as claimed in claim 1, wherein the suspension assembly comprises an eccentric assembly supported by the main frame for rotation about a first axis, the eccentric assembly pivotally supporting the dynamic crank support for rotation about a second axis offset from the first axis.

6. A bicycle as claimed in claim 5, wherein the spring mechanism comprises a spring secured between the main frame and the eccentric assembly to rotationally bias the eccentric assembly.

7. A bicycle as claimed in claim 5, wherein the second axis orbits about the first axis when the dynamic crank support moves from the uncompressed position to the compressed position.

8. A bicycle as claimed in claim 1, wherein the suspension assembly comprises a lower link for pivotally linking the dynamic crank support to the main frame.

9. A bicycle as claimed in claim 1, wherein the spring mechanism comprises a spring operatively positioned between the dynamic crank support and the main frame.

10. A bicycle frame assembly as claimed in claim 1, wherein the suspension assembly comprises an eccentric assembly having a lower shell secured to the main frame, and eccentric plates rotationally supported in the lower shell.

11. A bicycle frame assembly comprising:
a main frame;
a suspension assembly coupled to the main frame; the suspension assembly including:
  a dynamic crank support coupled to the main frame and movable along an arcuate path from an uncompressed position to a compressed position relative to the main frame; and
  a spring mechanism biasing the dynamic crank support toward the uncompressed position; and
  a crank assembly including a crank arm rotationally coupled to the dynamic crank support, wherein the crank assembly is movable with the dynamic crank support relative to the main frame between the uncompressed position and the compressed position.

12. A bicycle frame assembly as claimed in claim 11, wherein the suspension assembly further comprises a dynamic seat support coupled for movement with the dynamic crank support relative to the main frame between the uncompressed position and the compressed position, wherein an upper portion of the dynamic seat support is adapted to support a bicycle seat.

13. A bicycle frame assembly as claimed in claim 12, wherein the dynamic seat support and the dynamic crank support are rigidly coupled to each other and cooperatively form one bar of a four-bar linkage.

14. A bicycle frame assembly as claimed in claim 12, wherein the suspension assembly further comprises an upper link for pivotally linking the upper portion of the dynamic seat support to the main frame.

15. A bicycle frame assembly as claimed in claim 11, wherein the suspension assembly comprises an eccentric assembly supported by the main frame for rotation about a first axis, the eccentric assembly pivotally supporting the dynamic crank support for rotation about a second axis offset from the first axis.

16. A bicycle frame assembly as claimed in claim 15, wherein the spring mechanism comprises a spring secured between the main frame and the eccentric assembly to rotationally bias the eccentric assembly.

17. A bicycle frame assembly as claimed in claim 15, wherein the second axis orbits about the first axis when the dynamic crank support moves from the uncompressed position to the compressed position.

18. A bicycle frame assembly as claimed in claim 11, wherein the suspension assembly comprises a lower link for pivotally linking the dynamic crank support to the main frame.

19. A bicycle frame assembly as claimed in claim 11, wherein the spring mechanism comprises a spring operatively positioned between the dynamic crank support and the main frame.

20. A bicycle frame assembly as claimed in claim 11, wherein the suspension assembly comprises an eccentric assembly having a lower shell secured to the main frame, and eccentric plates rotationally supported in the lower shell.

* * * * *